United States Patent [19]
Tischer et al.

[11] Patent Number: 6,121,702
[45] Date of Patent: Sep. 19, 2000

[54] ELECTRIC MOTOR

[75] Inventors: Michael Tischer, Abstatt; Martin Huber, Oberkirch; Harold Bitzer; Wilhelm Braun, both of Buehl, all of Germany

[73] Assignee: Robert Bosch GmbH, Stuttgart, Germany

[21] Appl. No.: 09/091,103

[22] PCT Filed: Aug. 23, 1997

[86] PCT No.: PCT/DE97/01838

§ 371 Date: Dec. 30, 1998

§ 102(e) Date: Dec. 30, 1998

[87] PCT Pub. No.: WO98/16987

PCT Pub. Date: Apr. 23, 1998

[30] Foreign Application Priority Data

Oct. 12, 1996 [DE] Germany .................. 196 42 132

[51] Int. Cl.[7] ............... H02K 11/00; H01R 39/38
[52] U.S. Cl. ............................ 310/71; 310/239
[58] Field of Search ................ 310/71, 239, 249, 310/86, 87, 88, 247, 89; 336/107, 192; 439/775, 780, 248, 926

[56] References Cited

U.S. PATENT DOCUMENTS

| | | | |
|---|---|---|---|
| 1,792,044 | 2/1931 | Seyfried | 310/71 |
| 3,012,159 | 12/1961 | Druesedow | 310/71 |
| 3,842,302 | 10/1974 | Apostoleris | 310/239 |
| 3,967,148 | 6/1976 | Walsh | 310/239 |
| 4,381,468 | 4/1983 | Adam et al. | 310/239 |
| 4,677,333 | 6/1987 | Auzolat et al. | 310/239 |
| 5,304,880 | 4/1994 | Hisada et al. | 310/71 |
| 5,675,307 | 10/1997 | Krimm et al. | 337/107 |
| 5,705,868 | 1/1998 | Cox et al. | 310/71 |
| 5,886,448 | 3/1999 | Yoshida | 310/71 |
| 5,889,345 | 3/1999 | Iwata et al. | 310/71 |
| 5,903,072 | 5/1999 | Phillips | 310/71 |

*Primary Examiner*—Nestor Ramirez
*Assistant Examiner*—Dang Dinh Le
*Attorney, Agent, or Firm*—Ronald E. Greigg; Edwin E. Greigg

[57] ABSTRACT

The invention relates to an electric motor having a preferably cup-shaped motor housing and a contacting device for supplying electrical energy from outside to corresponding motor parts. The contacting device includes a busbar, which is disposed in the interior of the housing and can be shifted at least partially through an opening in a housing wall, and the outer end of the busbar is electrically connectable to a connection line and the inner end of the busbar is electrically connectable to corresponding motor parts.

14 Claims, 2 Drawing Sheets

ELECTRIC MOTOR

PRIOR ART

The invention relates to an electric motor having a preferably cup-shaped motor housing and a contacting device for supplying electrical energy from outside to corresponding motor parts.

Electric motors of this type are widely known. They typically include a cup-shaped motor housing, which is closed off by a cap mounted on top. Beforehand, the necessary electrical components are inserted into the interior of the housing; in a direct current motor, these include a commutator and brushes that contact it.

The supply of electrical energy to the brushes is effected by cables which are fixed on the brushes, for instance by soldering, and which extend through a recess or notch, typically open on its periphery, in the motor housing and are thus extended to the outside. Hence during the motor mounting process, with the cap not yet attached, these connection lines have to be secured and pulled to the outside. If these connection lines are not long enough to be carried directly to the energy source, then they are connected to additional supply lines.

However, connecting cables outside the motor housing has major disadvantages, in terms of liquid-tight sealing, over connection in the interior of the motor housing, which is already intrinsically sealed hermetically.

If correspondingly longer connection lines are used, there is the disadvantage of a loss of flexibility, to the extent that if not properly inserted or if the connections are changed, and if the aforementioned external connection is to be avoided, then the motor housing has to be opened and new connection lines have to be inserted.

ADVANTAGES OF THE INVENTION

The electric motor of the invention has the advantage over the prior art that connecting the connection lines to the brushes is possible even after mounting of the motor and with the cap in place on it. Moreover, the connection of the brushes with the connection lines coming from outside is located in the interior of the motor housing, so that the sealing of the housing is also utilized for this connection. Thus costs can be reduced, without impairing the connection flexibility or the tightness of the housing.

Because the contacting device includes at least one busbar disposed in the interior of the housing, and this busbar is disposed so that it can be displaced outward through an opening in the housing wall, the connection lines can be secured even when the motor housing is closed. All that is needed is for the busbar to be pulled at least partway outward, and then pressed back inside again after the connection with the connection line is made.

The busbars are preferably disposed such that they are shiftable radially to the cup-shaped motor housing. The busbars are preferably guided in a retainer disposed in the interior of the housing, so that shifting is possible in only a single plane.

The electrical supply to the brushes is effected via electrical lines, which are inserted or welded or soldered, preferably on the inner end of the busbar, into a clamp device mounted there. This allows a simple connection to be achieved.

The connection with the connection cable is effectively accomplished at a connection portion of the busbar that extends perpendicular to the shifting direction. The connection is made by screwing, for instance, or welding or soldering, or by means of a plug contact.

The busbar is preferably provided with a protuberance, which cooperates with a corresponding protrusion in the retainer, so as to form a snap closure. The disposition of the protuberance and the protrusion is effected such that the busbar snaps into place in the inserted position. Unintended shifting of the busbar is thus prevented.

The embodiment of a region of the retainer as a sliding bed, in which the busbar is located and which guides the busbar on at least three sides, is especially advantageous.

Further advantageous features of the invention will become apparent from the details set forth herein.

BRIEF DESCRIPTION OF THE DRAWINGS

The invention will now be described in further detail in terms of an exemplary embodiment in conjunction with the drawings. Shown are.

DESCRIPTION OF THE EXEMPLARY EMBODIMENT

Figure 1C:
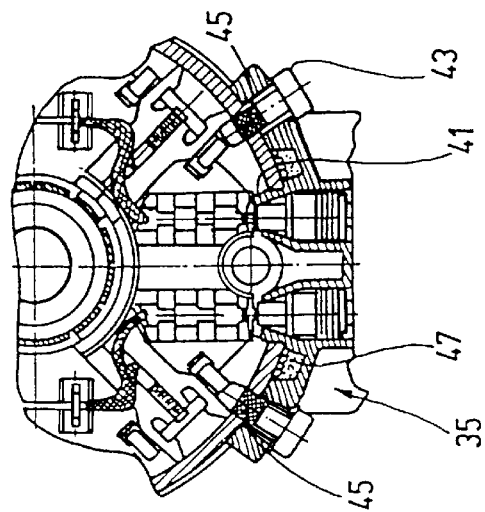
FIGS. 1a–1c, each, a portion of a sectional view of an electric motor in various phases of the mounting process.

In FIG. 1, an electric motor 1 is shown in fragmentary cross section, and in particular, a contacting device 3 can be seen. The other elements present in an electric motor 1 embodied as a commutator motor are shown merely schematically and will be described only briefly below.

The motor has a cup-shaped motor housing 5, which is open on a face end located parallel to the plane of the drawing. This opening is typically closed off with a bearing cap.

Located in the interior of the motor housing 5 is a commutator 7, from which lines, not shown, lead to the motor windings, and which is supplied with current by brushes 9. The two brushes, disposed at an angle of approximately 90° from one another, are each held in a brush holder 11 in such a way that they are shiftable radially to the annular commutator 7.

Each of the brushes 9 is connected electrically via a line 13 to a clamp 15, to which a further line 17 is connected.

This line 15 leads to a busbar 19, which is part of the contacting device 3. The line 17 is inserted into a clamp device provided on the busbar, and is fixed securely.

The busbar 19 itself comprises an electrically conductive material, such as copper, and has an elongated strip-like shape. A clamp 21 extending perpendicular to the longitudinal axis of the busbar is provided on the inner end of the busbar 19. On the opposite end of the busbar 19 is a further clamp 23, extending perpendicular to the longitudinal axis, which acts as a receptacle for the connection portion coming from outside.

Because of the conductivity of the busbar 19, an electrical connection is thus made between the outer clamp 23, which is also conductive, and the brush 19, via the conductive clamp 21, the line 17, the clamp 15, and the line 13.

The busbar 19 is guided in a retainer 25, which limits the direction of motion of the busbar to its longitudinal direction. To that end, at least some portions of all the long sides of the busbar 19 rest on corresponding boundary faces of the retainer 25. Thus the busbar can be displaced only in its longitudinal direction.

The retainer 25 is disposed in the housing interior such that its longitudinal axis extends parallel to the radius of the circular housing wall. On the top side of the retainer—in terms of the plane of the drawing—struts 27 are provided, which limit the upward motion of the busbar. It can be seen clearly in FIG. 1 that the struts 27 do not extend all the way past the width of the busbar 19, but instead already end in the peripheral region of the busbar. Thus two opposed struts 27 form one gap 29. The width of this gap 29 is at least equivalent to the width of the inner clamp 21, so that this clamp can be moved between the struts when the busbar 19 is shifted.

An opening 31 is provided in the housing wall, in the region of the contacting device 3, and its size is selected such that the two busbars 19 can be shifted outward through this opening.

Figure 1B:
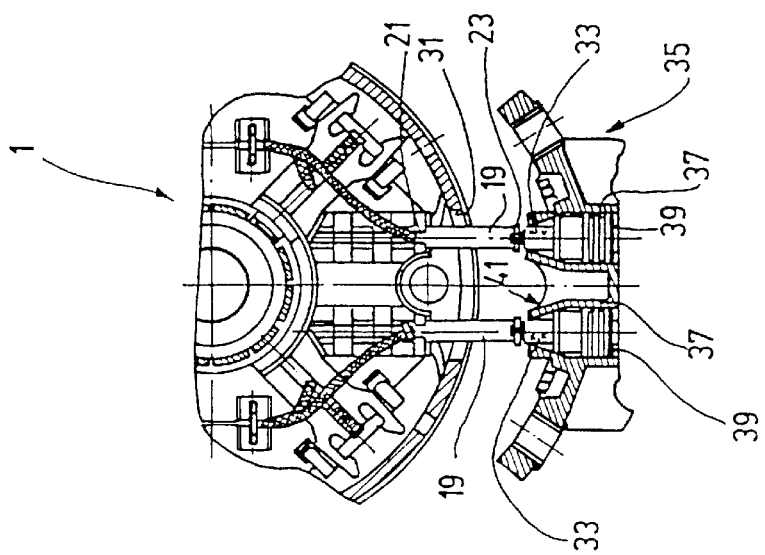
Figure 1A:
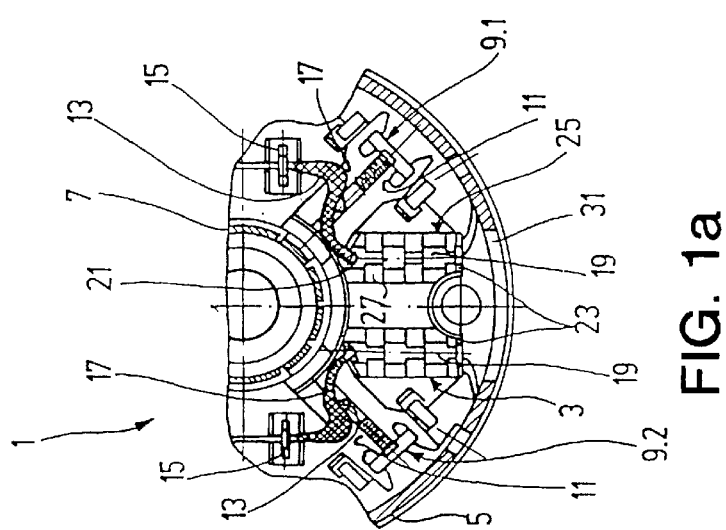

FIG. 1b shows the electric motor 1 of FIG. 1a with the busbars 19 pulled out. The busbars are shifted by a distance approximately equal to their length, and as a result the inner clamp 21 meets a stop 22 that is provided in the outer end region of the retainer 25. The stop assures that the busbar 19 cannot be pulled all the way out of the housing.

In the pulled-out state of the busbars 19, connection lines 33 can be secured to the clamps 23 in a simple way, for instance by soldering or welding, or simply by firm clamping. The connection lines 33 themselves are retained by a contacting flange 35. This flange has one channel 37 for each connection line 33, and a seal 39 is provided in each channel. This seal assures that liquid cannot escape through this channel, past the connection line 33. Preferably, so-called one-shot seals are used.

In the section shown it can be seen clearly that the contacting flange 35 has a shape adapted to the circular wall of motor housing 5. In the region of the channels 37, the contacting flange 35 has a contacting extension 41, which projects from the adjacent face. The size of this contacting extension 41 is equivalent to the size of the opening 31, and thus it completely fills the opening.

This is shown in FIG. 1c. In this last method step, the contacting flange 35 is pressed inward radially to the commutator 7 until the face of the contacting flange 35 oriented toward the motor housing rests on the wall of the motor housing 5. It can be seen clearly that the contacting extension 41 of the contacting flange 35 fills the opening 31. The radial length of the contacting extension 41 is selected to be somewhat greater than the thickness of the motor housing wall, so that the clamps 23 of the busbar 19 are located on the inside of the housing. For securing the contacting flange 35, screws 43 are provided, which reach through bores correspondingly provided in the contacting flange 35 and in the wall of the motor housing 5. Conventional seals 45 are associated with the screws 43 in order to seal off these bores.

To prevent the entry of liquid through the opening 31, the contacting flange 35 has a seal 47, which surrounds the contacting extension 41 and thus, in the firmly screwed state, also surrounds the opening 31.

Figure 2:
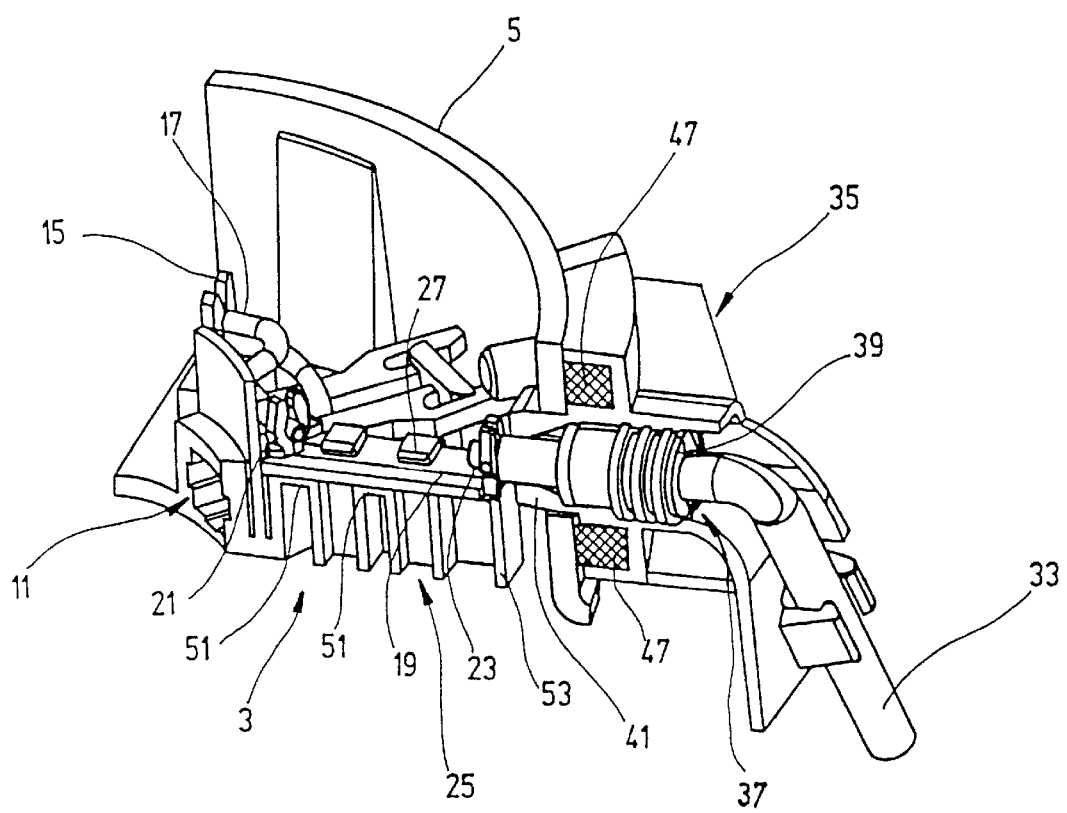
FIG. 2, a fragmentary perspective view of a contacting device.

In FIG. 2, the contacting device 3 and the contacting flange 35 can be seen in a perspective sectional view. The clamps, 21 and 23, which are mounted on the busbar 19, and the clamp 15 to which the line 17 is secured can be seen clearly.

The busbar 19 rests on supports 51, which are embodied between ribs that extend perpendicular to the longitudinal direction of the busbar. The struts 27 that form the upward limitation are disposed opposite the supports 51.

It cannot be seen from FIG. 2 that on the face of the busbar 19 toward the supports 51, in the region of the outer rib 53, a protuberance is provided, which when the busbar 19 is pulled out first has to slide over the upper edge of the rib 53. This requires great force, so that unintentional sliding out of the busbar 19 can be averted. It is understood that the protuberance may also be mounted on the clamp 23 or the clamp 21.

It is clearly seen in FIG. 2 that the retainer 25 is part of the brush holder 11.

As already mentioned, the face of the contacting flange 35 toward the housing 5 rests tightly against the housing wall, and the opening 31 is surrounded by the seal 47. In addition, the contacting extension 41 of the contacting flange 35 protrudes through the opening 31 into the housing interior, and the circumferential face of the contacting extension 41 rests on the inside surface of the opening 31.

The channel 37 of the contacting flange 35, which extends into the housing interior, is very well sealed off from the entry of liquid by the multistage channel seal 39.

The foregoing relates to a preferred exemplary embodiment of the invention, it being understood that other variants and embodiments thereof are possible within the spirit and scope of the invention, the latter being defined by the appended claims.

We claim:

1. An electric motor having a motor housing (5) and a contacting device (3) for supplying electrical energy from outside to corresponding motor parts (9) in an interior of said housing, the contacting device (3) includes at least one busbar (19), which is totally disposed in the interior of the housing and is shifted at least partially through an opening (31) in a housing wall, and an outer end of said busbar is electrically connected to a connection line and whose inner end is electrically connectable to corresponding motor parts, said busbar (19) is guided in a retainer (25) which is totally disposed in the interior of the housing and is part of a brush holder (11) whereby the retainer (25) has a region embodied as a sliding bed in which the busbar is located and is shifted, and the busbar (19) is shiftable parallel to a radius of the motor housing (5).

2. An electric motor according to claim 1, in which one busbar (19) is provided for each connection line (33).

3. An electric motor according to claim 2, in which the busbar (19) is shiftable parallel to a radius of the motor housing (5).

4. An electric motor according to claim 2, in which said inner end of the busbar (19) has a clamp into which an electric line is clamped, by welding or soldering so that an electrical connection is made.

5. An electric motor according to claim 2 in which the outer end of the busbar (19) has a connection portion extending perpendicularly to a shifting direction.

6. An electric motor according to claim 5, in which on a face of the busbar (19) oriented toward the retainer (25), a protuberance is provided, which together with a corresponding recess on the retainer acts as a re-releasable snap closure.

7. An electric motor according to claim 6, in which at least one strut (27) on the retainer (25) is provided, which fits at least partway over the busbar (19), thereby fixing the busbar in a sliding bed perpendicular to the shifting direction.

8. An electric motor according to claim 1, in which said inner end of the busbar (19) has a clamp into which an electric line is clamped, by welding or soldering so that an electrical connection is made.

9. An electric motor according to claim 8, in which the clamp (21) is disposed perpendicularly to a shifting direction of the busbar.

10. An electric motor according to claim 1, in which on a face of the busbar (19) oriented toward the retainer (25), a protuberance is provided, which together with a corresponding recess on the retainer acts as a re-releasable snap closure.

11. An electric motor according to claim 1, in which at least one strut (27) on the retainer (25) is provided, which fits at least partway over the busbar (19), thereby fixing the busbar in a sliding bed perpendicular to the shifting direction.

12. An electric motor having a motor housing (5) and a contacting device (3) for supplying electrical energy from outside to corresponding motor parts (9) in an interior of said housing, the contacting device (3) includes at least one busbar (19), which is totally disposed in the interior of the housing and is shifted at least partially through an opening (31) in a housing wall, and an outer end of said busbar is electrically connectable to a connection line and whose inner end is electrically connectable to corresponding motor parts, said busbar (19) is guided in a retainer (25) which is totally disposed in the interior of the housing and is part of a brush holder (11) whereby the retainer (25) has a region embodied as a sliding bed in which the busbar is located and is shifted, and the outer end of the busbar (19) has a connection portion extending perpendicular to a shifting direction.

13. An electric motor according to claim 12, in which a contacting flange (35) is provided, which is connectable to the connection portion of the busbar (19) and is embodied such that it rests tightly against the outer wall face of the motor housing (5) and seals off the opening (31).

14. An electric motor according to claim 13, in which the contacting flange (35) has a cable seal (39), which is associated with the connection line (33) connected to the busbar and seals off a line conduit (37) to the interior of the housing.

* * * * *